United States Patent
Zhu et al.

(10) Patent No.: US 10,148,981 B2
(45) Date of Patent: Dec. 4, 2018

(54) METHODS OF PALETTE CODING WITH INTER-PREDICTION IN VIDEO CODING

(71) Applicant: MediaTek Singapore Pte. Ltd., Singapore (SG)

(72) Inventors: Weijia Zhu, Beijing (CN); Kai Zhang, Beijing (CN); Xianguo Zhang, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 15/556,389

(22) PCT Filed: Mar. 18, 2016

(86) PCT No.: PCT/CN2016/076726
§ 371 (c)(1),
(2) Date: Sep. 7, 2017

(87) PCT Pub. No.: WO2016/150343
PCT Pub. Date: Sep. 29, 2016

(65) Prior Publication Data
US 2018/0041774 A1    Feb. 8, 2018

(30) Foreign Application Priority Data

Mar. 20, 2015   (WO) ............... PCT/CN2015/074728
Jun. 12, 2015   (WO) ............... PCT/CN2015/081374

(51) Int. Cl.
*H04N 19/597* (2014.01)
*H04N 19/503* (2014.01)
(Continued)

(52) U.S. Cl.
CPC ......... *H04N 19/597* (2014.11); *H04N 19/105* (2014.11); *H04N 19/139* (2014.11);
(Continued)

(58) Field of Classification Search
CPC .. H04N 19/597; H04N 19/105; H04N 19/139; H04N 19/159; H04N 19/176; H04N 19/577

See application file for complete search history.

(56) References Cited

U.S. PATENT DOCUMENTS

2012/0183066 A1   7/2012   Oh et al.
2013/0034152 A1   2/2013   Song et al.
(Continued)

FOREIGN PATENT DOCUMENTS

| CN | 103929651 A | 7/2014 |
| CN | 104301737 A | 1/2015 |
| WO | WO 2015/005754 A1 | 1/2015 |

OTHER PUBLICATIONS

International Search Report dated May 27, 2016, issued in application No. PCT/CN2016/076726.
(Continued)

*Primary Examiner* — Zhihan Zhou
(74) *Attorney, Agent, or Firm* — Oblon, McClelland, Maier & Neustadt, L.L.P.

(57) ABSTRACT

Method and apparatus for video coding using palette coding modes including a copy inter mode are disclosed. When the copy inter mode is selected, one or more consecutive current samples or indices of the current block are predicted by one or more consecutive reference samples or indices of a reference block at corresponding locations. Motion vector (MV) information for locating the reference block can be signalled in a bitstream for the current block. The motion vector information may be related to MV for the reference block corresponding to an Inter-prediction coding unit (CU) or a block vector (BV) for an Intra Block Copy (IntraBC) coded block. The location of the reference block can be
(Continued)

determined implicitly without position information of the reference block signalled in a bitstream for the current block.

28 Claims, 8 Drawing Sheets

(51) Int. Cl.
    *H04N 19/593*     (2014.01)
    *H04N 19/105*     (2014.01)
    *H04N 19/176*     (2014.01)
    *H04N 19/463*     (2014.01)
    *H04N 19/139*     (2014.01)
    *H04N 19/159*     (2014.01)
    *H04N 19/577*     (2014.01)
    *H04N 19/147*     (2014.01)

(52) U.S. Cl.
    CPC ......... *H04N 19/159* (2014.11); *H04N 19/176* (2014.11); *H04N 19/463* (2014.11); *H04N 19/503* (2014.11); *H04N 19/577* (2014.11); *H04N 19/593* (2014.11); *H04N 19/147* (2014.11)

(56) References Cited

U.S. PATENT DOCUMENTS

| 2015/0373359 | A1* | 12/2015 | He | H04N 19/70 |
| | | | | 375/240.12 |
| 2015/0381994 | A1* | 12/2015 | Yu | H04N 19/186 |
| | | | | 375/240.24 |
| 2016/0057447 | A1* | 2/2016 | Pu | H04N 19/105 |
| | | | | 375/240.12 |
| 2016/0100174 | A1* | 4/2016 | Yu | H04N 19/186 |
| | | | | 375/240.24 |
| 2016/0173892 | A1 | 6/2016 | Park et al. | |
| 2017/0289566 | A1* | 10/2017 | He | H04N 19/52 |

OTHER PUBLICATIONS

Guo, L., et al.; "Non-RCE3: Modified Palette Mode for Screen Content Coding;" Joint Collaborative Team on Video Coding (JCT-VC) of ITU-T SG 16 WP 3 and ISO/IEC JTC 1/SC 29/WG 11; Jul.-Aug. 2013; pp. 1-6.

* cited by examiner

METHODS OF PALETTE CODING WITH INTER-PREDICTION IN VIDEO CODING

CROSS REFERENCE TO RELATED APPLICATIONS

The present invention claims priority to PCT Patent Application, Serial No. PCT/CN2015/074728, filed on Mar. 20, 2015 and PCT Patent Application, Serial No. PCT/CN2015/081374, filed on Jun. 12, 2015. The PCT Patent Applications are hereby incorporated by reference in their entireties.

FIELD OF THE INVENTION

The present invention relates to palette coding for video data. In particular, the present invention relates to palette coding that uses non-local predictor.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Figure 1:
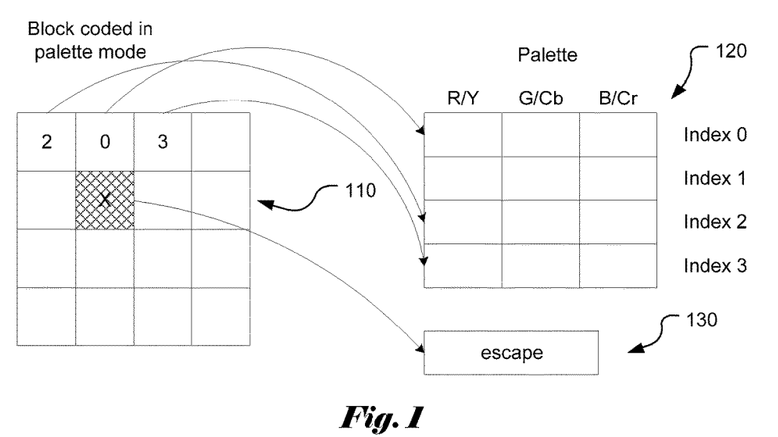
FIG. 1 illustrates an example of palette coding, where pixels in a current block are represent by palette indices from a palette.

Along with the High Efficiency Video Coding (HEVC) standard development, the development of extensions of HEVC has also started. The HEVC extensions include screen content coding (SCC). Due to specific characteristics of screen contents, coding tools have been developed and demonstrated significant gains in coding efficiency. Among them, the colour index coding (a.k.a. major colour based coding) techniques represent block of pixels using indices from a palette (i.e., major colours), and encode the palette and the indices by exploiting spatial redundancy. While the total number of possible colour combinations is huge, the number of colours in an area of picture is usually very limited for typical screen contents. The basic idea behind the palette mode is that the samples in the CU can be represented by a small set of representative colour values. This set of representative colour values is referred to as the palette for the block. It is also possible to indicate a sample that is outside the palette by signalling an escape symbol followed by component values, which may be quantized. Each sample in the block can be assigned to a nearest index in the palette. FIG. 1 illustrates an example of palette coding, where pixels in a current block 110 are represented by palette indices from a palette 120. As shown in FIG. 1, the first three pixels on the top row are mapped to palette indices "2", "0" and "3" corresponding to the respective palette indices. The pixel "X" filled with crossed-lines indicates a pixel that cannot find a corresponding colour in the palette. This pixel is coded using an escape symbol along with the pixel value. Since each pixel can be represented by one palette index from a small-size palette, therefore, the colour index coding becomes very effective for screen content materials.

The palette indices for a block (i.e., the index map) are coded using two main run modes: 'INDEX' and 'COPY_ABOVE'. The escape symbol is signalled as an 'INDEX' mode. It is assigned an index equal to the maximum palette size. The mode is signalled using a flag except for the top row or when the previous mode is COPY_ABOVE. In the COPY_ABOVE mode, the current index and N1 following palette indices are copied from corresponding indices in the above row, where N1 is an integer. Since the pixels of the above row have been coded, there is no need to signal any index value for the COPY_ABOVE mode. In INDEX mode, N2 following indices have the same index value as the index at the current position, where N2 is an integer. The palette index is explicitly signalled for INDEX mode. For both INDEX and COPY_ABOVE modes, a run value is signalled to specify the number of subsequent samples that are also coded using the same mode. When the escape symbol is part of the run in INDEX or COPY_ABOVE mode, the escape component values are signalled for each escape symbol.

Figure 2:
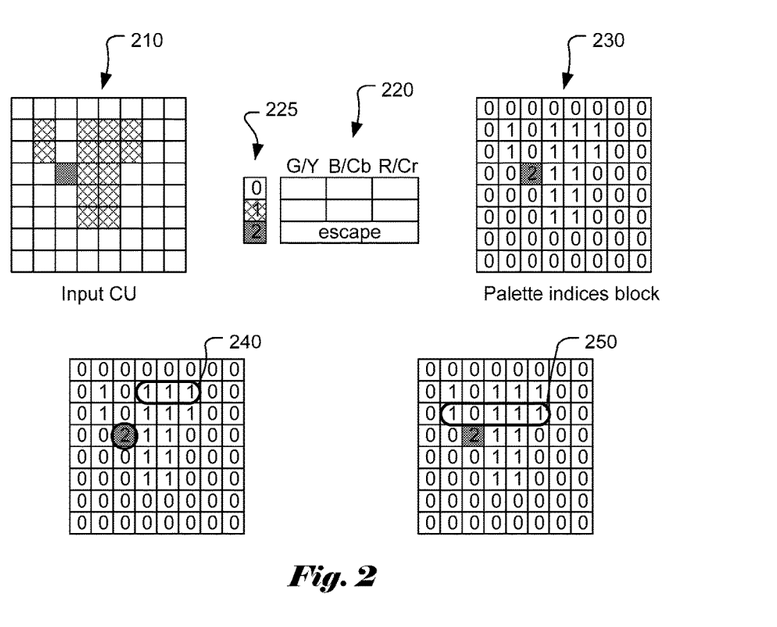
FIG. 2 illustrates an example of palette coding process, where the samples in a block are coded using INDEX or COPY_ABOVE mode.

FIG. 2 illustrates an example of palette coding process. The samples of a current block 210 consists only three different pixel values as indicated by blank background and two different fill patterns. The sample values are mapped into three palette indices 225 using palette 220. Palette index "2" corresponds to an escape symbol. An index map 230 is generated based on the palette and palette coding is applied to the index map. As mentioned above, the term 'index map' refers to the indices of pixels in a block. When the second row is coded, the three consecutive indices 240 with the index value equal to "1" can be coded in INDEX mode with run length equal to 3. The third row can be coded after the second row and the five consecutive indices 250 can be coded using COPY_ABOVE mode with run length equal to 5.

In the literature, INDEX mode is also referred as the copy index mode. The COPY_ABOVE mode is also referred as the copy above mode.

Figure 3:
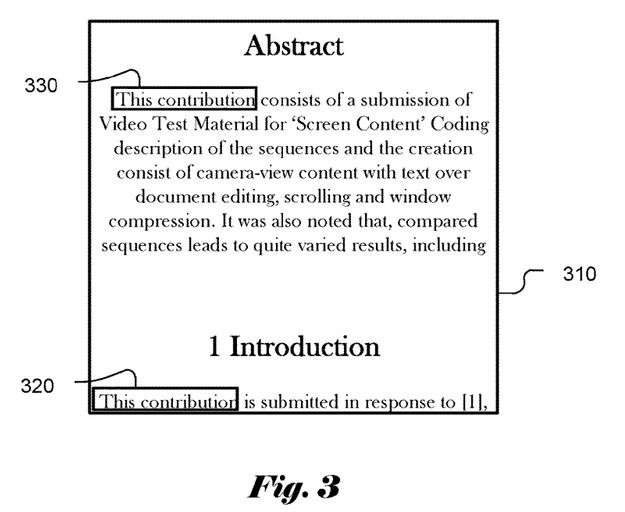
FIG. 3 illustrates an example of a screen picture, where a duplicated content in the screen picture appears in a non-local region that may be useful for palette coding.

The COPY_ABOVE mode in palette coding only refers to the palette indices of the samples in the row above. There may be non-local duplicated contents in a screen picture as shown in FIG. 3 that may be useful for palette coding. In FIG. 3, for a screen content picture 310, there exists a non-local duplicated content in area 330 for the screen content in area 320. Nevertheless, the COPY_ABOVE mode according to existing palette coding cannot deal with non-local duplicated indexes. It is desirable to develop techniques to explore palette coding using non-local duplicated contents.

BRIEF SUMMARY OF THE INVENTION

Method and apparatus for video coding using palette coding modes including a copy inter mode are disclosed. When the copy inter mode is selected, one or more consecutive current samples or indices of the current block are predicted by one or more consecutive reference samples or indices of a reference block at corresponding locations. Motion vector information can be signalled in a bitstream for the current block, where the motion vector information is used to locate the reference block. The motion vector information can be related to a motion vector (MV) for the reference block corresponding to an Inter-prediction 2N×2N coding unit (CU). The motion vector information may also be related to a block vector (BV) and the motion vector information is signalled in the bitstream in a same manner as BV signalling in Intra Block Copy (IntraBC) mode. The location of the reference block can be determined implicitly without position information of the reference block signalled in a bitstream for the current block.

The reference block can be in the current picture or the current depth image. The reference block may also be in a different picture from the current picture or a different depth image from the current depth image. The reference block can be from a reconstructed picture/a reconstructed depth image or a prediction picture/a prediction depth image of the current block.

A control flag specifying whether to enable the copy-inter mode can be signalled in the bitstream and the set of coding modes includes the copy-inter mode if the control flag indicates that the copy-inter mode is enabled. The control flag is each block, and the block corresponds to a coding unit (CU), a prediction unit (PU) or a transform unit (TU). Furthermore, the control flag can be coded by context adaptive binary arithmetic coding (CABAC). Whether to enable the copy-inter mode can also be determined implicitly at a decoder. The decision regarding whether to enable the copy-inter mode can depend on size, shape, partition type, coding mode, MV information or BV information of the current block, and the current block corresponds to a current coding unit (CU), a current prediction unit (PU) or a current transform unit (TU).

The reference block selected for the copy-inter mode may comprise reference samples, and the reference samples are converted to reference indices before the reference block is used to predict current indices of the current block. Each reference sample of the reference block can be converted to one reference index by selecting a nearest index from a reference palette. The reference block can be flipped horizontally, vertically, or both horizontally and vertically before the reference samples are converted to the reference indices. The reference block may also be rotated clockwise or counter-clockwise, transposed, or transformed using an arbitrary function before the reference samples are converted to the reference indices.

The reference block can be selected from multiple reference block candidates and selection of the reference block can be signalled explicitly by an encoder or implicitly derived by a decoder.

The current palette for the current block can be predicted by or copied from a reference palette of the reference block.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In order to improve coding efficiency for palette coding, a method to use non-local prediction (NLP) is disclosed. According to the NLP method, non-local prediction can be used to predict the samples in the current block. Compared to the conventional palette coding, which only explores the local correlation with a one or more left pixels or one or more pixels in the above row, the present invention further uses the non-local prediction to explore non-local correlation. Therefore, present invention can improve the coding efficiency over the conventional palette coding.

In one embodiment, one non-local image block is first located, and then one or more samples in the current block can be reconstructed by directly copying the corresponding samples in the non-local image block.

In another embodiment, non-local index map can be used to predict one or more indices of the index map of the current block.

Figure 4:
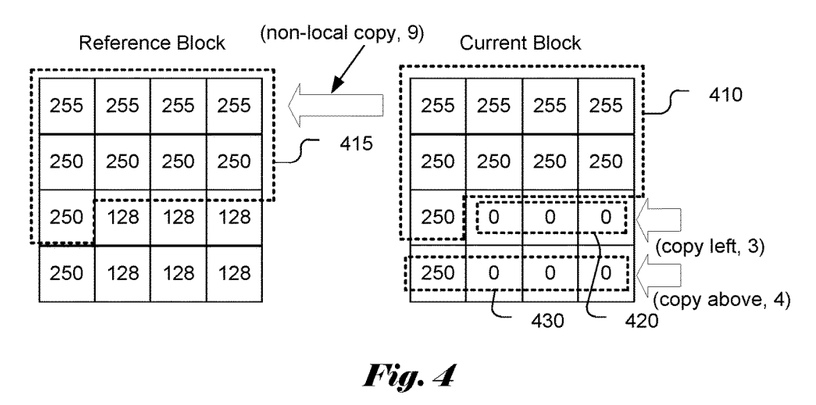
FIG. 4 illustrates an example of copy modes including the non-local prediction mode (NLP mode) for predicting samples of a current block.

In yet another embodiment, each sample in the current block can copy the sample of its left neighbour, its above neighbour or its non-local prediction, which corresponds to the copy left mode (i.e., INDEX mode), the copy above mode (i.e., COPY_ABOVE mode) and the non-local prediction mode respectively. In this disclosure, the copy left mode is also referred as the copy index mode, and the non-local prediction mode is also referred as the copy inter mode. Encoder can decide which copying mode to use for every sample. By using those copying modes, the current block can be represented by 2-tuple (m, l) codes, where m represents the copy mode for each starting sample and l is the length indicating the number of consecutive samples copied from respective reference samples associated with mode m. FIG. 4 illustrates an example of copy modes including the non-local prediction mode (i.e., NLP mode) for prediction samples of a current block. In FIG. 4, samples in area 410 are predicted by respective reference samples 415 in a non-local area, where 9 consecutive samples can be copied from the reference block. The NLP mode and run length equal to 9 can be signalled for the NLP mode. Samples in area 420 consist of 3 consecutive samples with the same sample value (i.e., "0") and the 3 samples can be coded using the copy left mode (i.e., copy index mode) with run length equal to 3. Furthermore, samples in area 430 are the same as samples in the row above. Therefore, samples in area 430 can be coded in the copy above mode with run length equal to 4.

The current block I can be reconstructed according to $I(x+i)=I(x-1+i)$ for the copy left mode, where i is from 0 to l and l is the second element of the current decoded 2-tuple. For the copy above mode, the current block I can be reconstructed according to $I(x+i)=I(x-w+i)$, where w is the width of the current block. For the non-local prediction mode, the current block I can be reconstructed according to $I(x+i)=R(x+i)$, where R represent the samples in the reference block.

Figure 5:
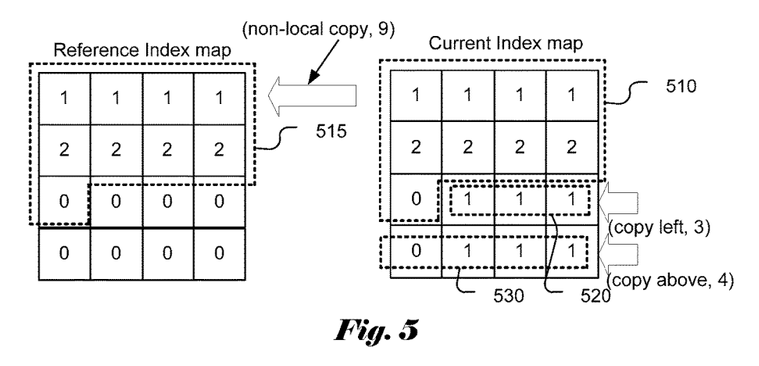
FIG. 5 illustrates an example of copy modes including the non-local prediction mode (NLP mode) for predicting indices of an index map of a current block.

In yet another embodiment, each index in the index map of the current block can copy the index of its left neighbour, its above neighbour or its non-local prediction corresponding to the copy left mode, copy above mode or non-local prediction modes respectively. Encoder can decide which copying mode to use for each index. By using those copying modes, the index map can be represented by 2-tuple (m, l) codes similar to those in the previous embodiment, where the copy modes are applied to the samples of the current block. FIG. 5 illustrates an example of copy modes including the non-local prediction mode (NLP mode) for prediction indices of an index map of a current block. In FIG. 5, indices of the index map in area 510 are predicted by respective reference indices 515 in a non-local area, where 9 consecutive indices can be copied from the reference block. The NLP mode and run length equal to 9 are signal for the NLP mode. Indices of the index map in area 520 consist of 3 consecutive indices with the same index value (i.e., "1") and the 3 indices can be coded using the copy left mode (i.e., copy index mode) with run length equal to 3. Furthermore, indices of the index map in area 530 are the same as indices in the row above. Therefore, indices of the index map in area 530 are coded in the copy above mode with run length equal to 4. The indices of the index map of the current block can be reconstructed according to the same reconstruction process as the previous embodiment for prediction samples of the current block.

In yet another embodiment, the non-local index map for a current block is determined first, and then the indices in the current index map can be derived by directly copying the corresponding indices in the non-local index map. After copying, a sample in the current block can be reconstructed by using the colour indicated by the corresponding index in the palette. An exemplary copying process is described for a reference block with the width and height equal to W and H respectively. If $R(x, y)$ is an index in the non-local index map with x from 0 to W−1 and y from 0 to H−1, after the copying process, the sample $S(x, y)$ in the current block is reconstructed from the index according to $S(x, y)=P[R(x, y)]$ with $R(x, y)$ from 0 to N−1, where P is the palette of the current block and N is the number of colours in the palette (i.e., the palette size).

In yet another embodiment, all samples in the current block are reconstructed by the copying method including a non-local prediction mode as mentioned above. In another embodiment, one or some samples in the current block are reconstructed by the copying method including a non-local prediction mode as mentioned above. However, at least one other sample in the current block is reconstructed by other methods.

Figure 6:
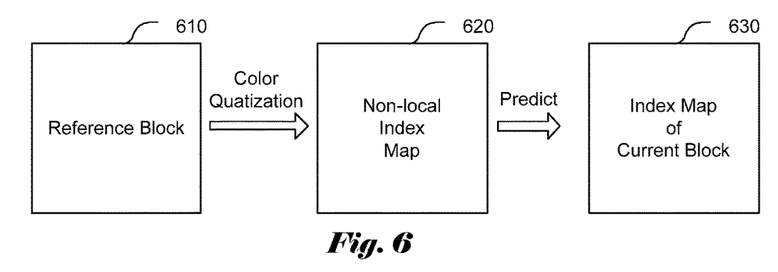
FIG. 6 illustrates an example of using samples of a reference block to derive the indices of the non-local index map and using the derived non-local index map to predict the current index map according to one embodiment of the present invention.

In yet another embodiment, the non-local index map is derived from a reference block comprising reference samples. The reference block 610 is first obtained, and then a colour quantization algorithm is used to derive the indices of the non-local index map 620 from the reference samples of the reference block as shown in FIG. 6. The derived non-local index map is then used to predict the current index map 630. Colour quantization is the process for converting samples to indices, where each sample is assigned a corresponding index according to some criteria. For example, the corresponding index is the index of the nearest, based on any distance measurement, palette entry of the current block.

In still another embodiment, the palette of the current block can be predicted by the palette of the reference block. In still another embodiment, the palette of the current block can be copied as the palette of the reference block.

The reference block for the non-local prediction mode can be in the same picture of the current block. However, the reference block for the non-local prediction mode can also be in a different picture of the current block. In other words, the non-local prediction mode can be applied in the Intra-picture prediction as well as Inter-picture prediction.

The reference block can be from the reconstructed image or a prediction image of the current picture. As is known in the field of video coding, reconstructed image data may have to be processed before the reconstructed image data can be used as prediction image data. For example, if the motion vector associated with the reference block has fractional pixel resolution, the reconstructed image data have to be interpolated to generate the prediction image data.

The position of the reference block can be signalled from the encoder to the decoder explicitly. Therefore, a decoder can locate the reference block according to the signalled position information. Furthermore, the position of the reference block can be signalled from the encoder to the decoder explicitly in the same way as the signalling method of block vector (BV) in the Intra block copy (IBC) mode as specified in JCTVC-T1005 (Joshi, et al., *HEVC Screen Content Coding Draft Text* 3, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T1005), where the difference of BV (i.e., BV difference) is signalled. However, the position of the reference block may also be derived by the decoder implicitly according to another embodiment.

Figure 7:
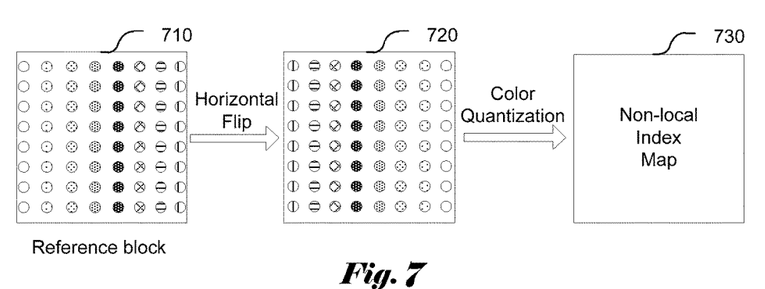
FIG. 7 illustrates an example of horizontally flipping a reference block before it is used to generate the non-local index map according to one embodiment of the present invention.

In still another embodiment, the reference block 710 is horizontally flipped into a flipped reference block 720 before it is used to generate the non-local index map 730, as shown in FIG. 7. The reference block can be in the same picture of the current block, or it can be in a different picture of the current block. An exemplary flipping process is described for a reference block with the width equal to W. If R(x, y) is a sample in the reference block with x from 0 to W−1, then a sample R'(x, y) in the flipped reference block can be derived as R'(x, y)=R(W−1−x, y).

Figure 8:
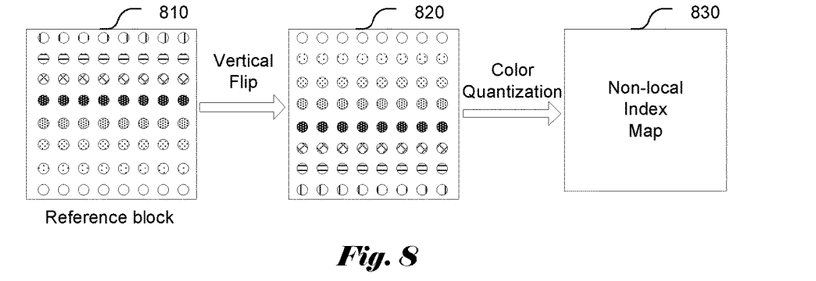
FIG. 8 illustrates an example of vertically flipping a reference block before it is used to generate the non-local index map according to one embodiment of the present invention.

Similarly, the reference block 810 can be vertically flipped to generate a vertically flipped reference block 820 before it is used to generate the non-local index map 830, as depicted in FIG. 8. The reference block can be in the same picture of the current block, or it can be in a different picture of the current block. An exemplary flipping process is described for a reference block with the height of the reference block equal to H. If R(x, y) is a sample in the reference block with y from 0 to H−1, then a sample R'(x, y) in the flipped reference block can be derived as R'(x, y)=R(x, H−1−y).

Figure 9:
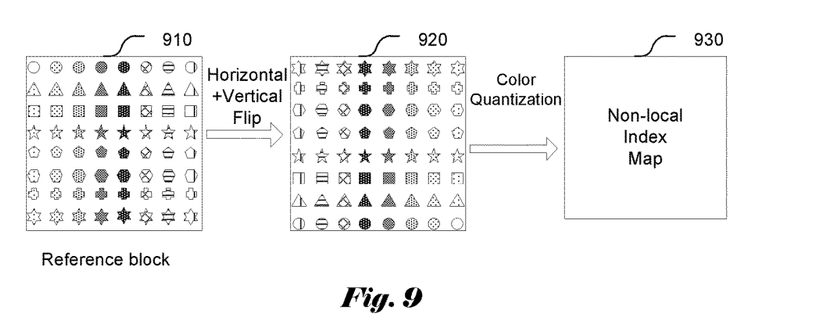
FIG. 9 illustrates an example of vertically and horizontally flipping a reference block before it is used to generate the non-local index map according to one embodiment of the present invention.

In still another embodiment, a reference block 910 is vertically flipped then horizontally flipped, or horizontally flipped then vertically flipped to generate a flipped reference block 920 before it is used to generate the non-local index map 930, as depicted in FIG. 9. The reference block can be in the same picture of the current block, or it can be in a different picture of the current block. An exemplary flipping process is described for a reference block with the width equal to W and the height equal to H. If R(x, y) is a sample in the reference block with x from 0 to W−1 and y from 0 to H−1, then a sample R'(x, y) in the flipped reference block can be derived as R'(x, y)=R(W−1−x, H−1−y).

Figure 10:
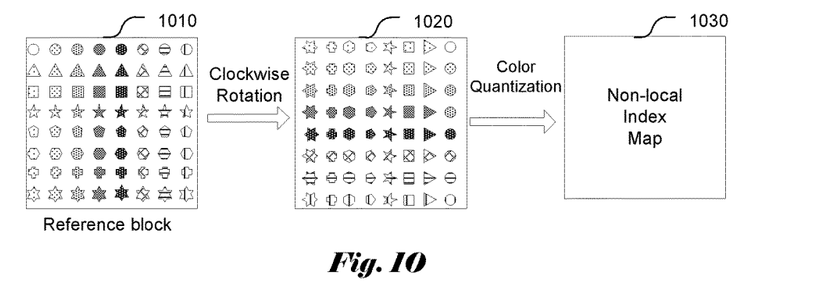
FIG. 10 illustrates an example of rotating a reference block clockwise before it is used to generate the non-local index map according to one embodiment of the present invention.

In still another embodiment, a reference block 1010 is rotated clockwise into a rotated reference block 1020 before it is used to generate the non-local index map 1030, as depicted in FIG. 10. The reference block can be in the same picture of the current block, or it can be in a different picture of the current block. An exemplary rotation process is described for a reference block with the height equal to H. If R(x, y) is a sample in the reference block with y from 0 to H−1, then a sample R'(x, y) in the rotated reference block can be derived as R'(x, y)=R (H−1−y, x).

Figure 11:
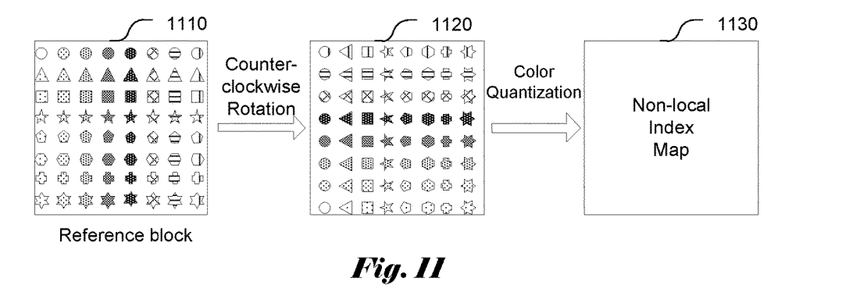
FIG. 11 illustrates an example of rotating a reference block counter-clockwise before it is used to generate the non-local index map according to one embodiment of the present invention.

In still another embodiment, a reference block 1110 is rotated counter-clockwise into a rotated reference block 1120 before it is used to generate the non-local index map 1130, as depicted in FIG. 11. The reference block can be in the same picture of the current block, or it can be in a different picture of the current block. An exemplary rotation process is described for a reference block with the width equal to W. If R(x, y) is a sample in the reference block with x from 0 to W−1, then a sample R'(x, y) in the rotated reference block can be derived as R'(x, y)=R(y, W−1−x).

Figure 12:
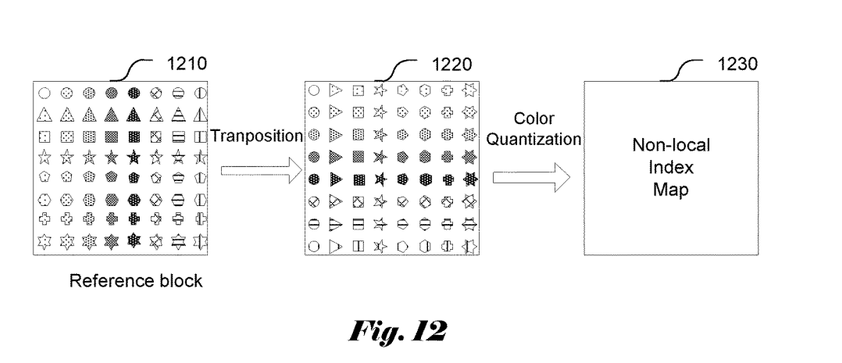
FIG. 12 illustrates an example of transposing a reference block before it is used to generate the non-local index map according to one embodiment of the present invention.

In still another embodiment, a reference block 1210 is transposed into a transposed reference block 1220 before it is used to generate the non-local index map 1230, as shown in FIG. 12. The reference block can be in the same picture of the current block, or it can be in a different picture of the current block. An exemplary transposition process is described as follows. If R(x, y) is a sample in the reference block, then a sample R'(x, y) in the transposed reference block can be derived as R'(x, y)=R (y, x).

In still another embodiment, a reference block is transformed arbitrarily before it is used to generate the non-local index map. The reference block can be in the same picture of the current block, or it can be in a different picture of the current block. An exemplary transformation process is described as follows. If R(x, y) is a sample in the reference block, then a sample R'(x, y) in the transformed reference block can be derived as R'(x, y)=R(f(x,y),g(x, y)), where f and g are any functions. Function f can depend on x only, on y only, or on both. Function g can depend on x only, on y only, or on both. Function f can depend on the size, width, height, shape or coding mode of the current block or the reference block. Function g can depend on the size, width, height, shape or coding mode of the current block or the reference block. Function f can depend on the type of the current or reference picture or slice. Function g can depend on the type of the current or reference picture or slice. Function f can be a linear or non-linear function. Function g can be a linear or non-linear function. f and g can be the same, or different.

Figure 13:
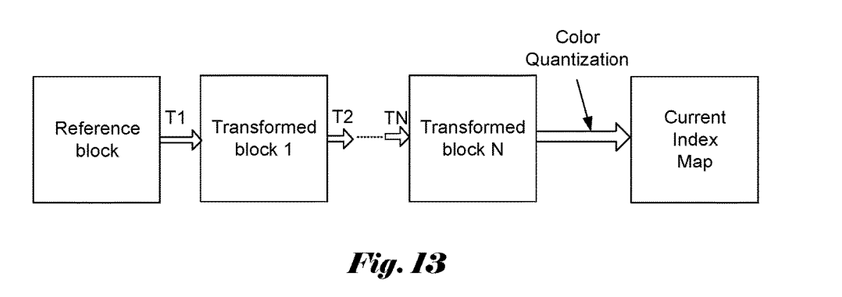
FIG. 13 illustrates an example of transforming a reference block in multiple stage transformation before it is used to generate the non-local index map according to one embodiment of the present invention.

In still another embodiment, before the reference block is used to generate the non-local index map, it is transformed by a combination of two or more transformation methods, such as horizontal flipping, vertical flipping, clock wise rotation, counter-clockwise rotation, transposition and any arbitrary transformation. The transformation can be done in a cascade way, in which a reference block is transformed sequentially before it is used predict the current block as shown in FIG. 13. The output from a previous transformation is treated as the input to a subsequent transformation.

Figure 14:
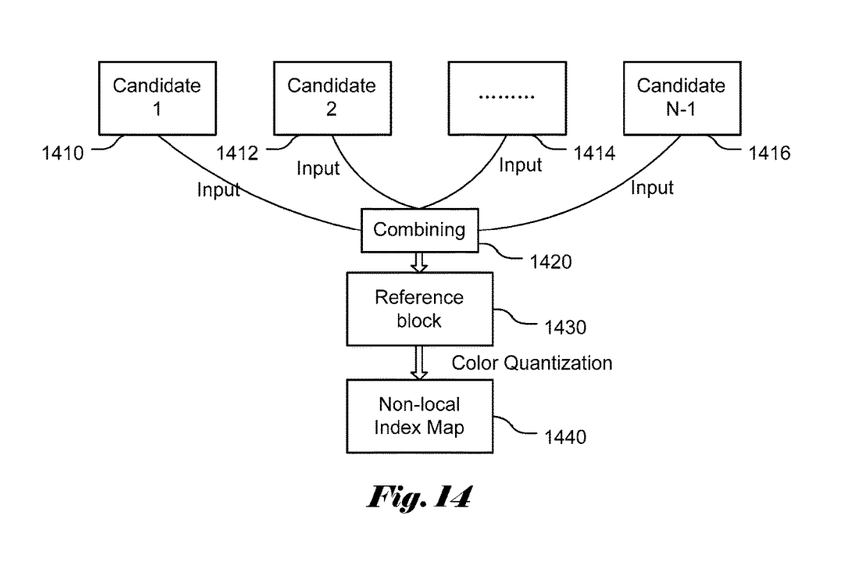
FIG. 14 illustrates an example of generating a reference block from multiple candidates according to one embodiment of the present invention.

In still another embodiment, multiple block candidates are combined together to generate the reference block. FIG. 14 illustrates an example of generating a reference block from multiple candidates according to this embodiment. The combining unit 1420 determines how to generate a reference block 1430 from the N candidates (1410, 1412, 1414 and 1416). A non-local index map 1440 is derived from the reference block 1430 using colour quantization. The multiple candidates can be in the same picture of the current block, or they can be in a different picture of the current block. An exemplary combination process is described as follows. If the width and height of each candidate are W and H respectively, N is the number of candidates, and R(k, x, y) is a sample in the k-th candidate with x from 0 to W−1 and y from 0 to H−1, then a sample R'(x, y) in the reference block can be derived as R'(x, y)=f (R(1, x, y), R (2, x, y), . . . R (k, x, y)), where f can be any function. For example, f can be an average function and the reference block is derived as:

$$R'(x, y) = \frac{\sum_{k=1}^{N} R(k, x, y)}{N}.$$

The above embodiments disclose techniques to convert a reference block comprising reference samples to a non-local index map using conversion methods such as colour quantization. Furthermore, various techniques are disclosed to transform a reference block before it is used to generate the non-local index map. For example, flipping techniques such as flipping the reference block horizontally, vertically, or both horizontally and vertically to generate a flipped reference block have been disclosed above to generate a flipped reference block before the reference block is converted to the non-local index map. The transformation techniques may also correspond to rotation (clockwise or counter-clockwise), transposition, or arbitrary reforming. In other embodiments, the non-local index map can be used to predict the current index map. The transformation techniques including flipping, rotation and transposition can also be applied to the non-local index map before it is used to predict the current index map. The descriptions of transformation techniques disclosed above for a reference block are applicable to the non-local index map except that no colour quantization is applied. In this case, R(x, y) corresponds to an index in the non-local index map and R'(x, y) represent a pre-processed index in the non-local index map by flipping, rotation or transposition.

In still another embodiment, an encoder can decide whether to use non-local index prediction method and signal the information to the decoder. The information can be signalled for a macro-block (MB), a coding tree unit (CTU), a coding unit (CU), a transform unit (TU) or a prediction unit (PU). The encoder can make the decision based on the rate-distortion optimization (RDO) criterion or other criterions.

In still another embodiment, a decoder can infer whether to use non-local index prediction method for the block implicitly. In this case, no information is signalled from the encoder explicitly to indicate whether to apply non-local index prediction method or not.

Figure 15:
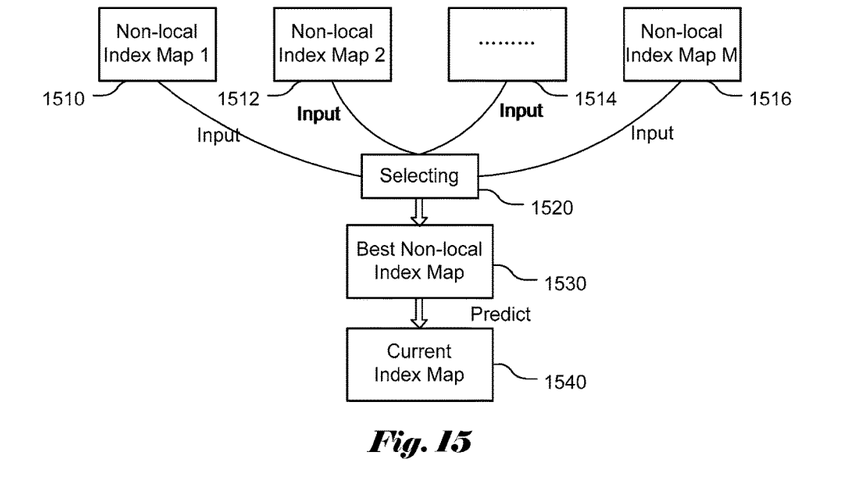
FIG. 15 illustrates an example of selecting a non-local index map from multiple non-local index maps according to one embodiment of the present invention.

In still another embodiment, multiple non-local index maps are provided as prediction candidates. An encoder can decide which non-local index map to use and signal the information to the decoder. FIG. 15 illustrates an example of selecting a non-local index map from multiple non-local index maps according to this embodiment. The selecting unit 1520 selects a best non-local index map 1530 and use the selected best non-local index map to predict the current index map 1540. The information can be signalled for a macro-block (MB), a coding tree unit (CTU), a coding unit (CU), a transform unit (TU) or a prediction unit (PU). The encoder can make the decision based on the rate-distortion optimization (RDO) criterion or other criterions.

In still another embodiment, multiple non-local index maps can be provided as prediction candidates. A decoder can infer whether to use one of the non-local index maps for the current index map implicitly. No information is signalled from the encoder explicitly to indicate whether to apply non-local index copying or not.

The non-local index prediction methods can also be applied to the palette mode coding or any other index-based coding scheme.

The non-local index prediction methods can be applied to a block with size M×N, where M and N are arbitrary positive integers. M can be equal to N (i.e., square block) or M can be unequal to N (i.e., non-square block). In another example, M can be equal to a*N, where a is a positive integer equal or larger than 2. In another example, N can be equal to b*M, where b is a positive integer equal or larger than 2. In another example, M or N can be 1.

The non-local index prediction methods can be applied to all components of an image. For example, it can be applied to Y/U/V components or G/R/B components. It may be applied to some of the colour components of an image. It can also be applied to depth component for 3D video/image coding.

The non-local index prediction method can be applied separately for a component to determine whether to apply the non-local index prediction method or not and to signal this information for each block. Alternatively, all components can be treated in the same manner and only single information is signalled for a block.

The non-local index prediction method can be inferred at the decoder implicitly for each component separately regarding whether to use the non-local index prediction method or not for a block. Alternatively, all components can be treated in the same manner for a block.

If multiple non-local index maps are provided, it can be done separately for each component to select a non-local index map and to signal this information for a block. Alternatively, all components can be treated in the same manner and only single information is signalled for a block.

If multiple non-local index maps are provided, it can be done separately for each component to select non-local index map for a block at decoder implicitly by inference. Alternatively, all components can be treated in the same manner for a block.

In still another embodiment, whether to apply non-local index prediction or not can be decided or inferred depending on the size, shape or coding mode of the current block or the current CU/TU/PU.

If multiple non-local index maps are provided, which prediction index map to be used can be decided or inferred depending on the size, shape or coding mode of the current block or the current CU/TU/PU.

In still another embodiment, the non-local index prediction method is only allowed for CU with palette mode. In still another embodiment, the non-local index prediction method is only allowed for CU with partition size 2N×2N.

In still another embodiment, a flag to indicate whether non-local index prediction is used for the current index map can be coded by context adaptive binarized arithmetic coding (CABAC) for a CU, TU or PU. The flags in neighbouring blocks can be used to determine the context model for coding the flag for the current block. The flag is treated as 0 if it is not signalled. Alternatively, it is treated as 1 if it is not signalled.

In still another embodiment, if multiple non-local index maps are provided, multiple flags are coded by context adaptive binarized arithmetic coding (CABAC) for a CU, TU or PU to indicate which non-local index map is used for the current index map. The flags in its neighbouring blocks are used to determine the context model for coding the flag for the current block. The flag is treated as 0 if it is not signalled. Alternatively, it is treated as 1 if it is not signalled.

The non-local index prediction mentioned above can be enabled or disabled for various combinations of the conditions listed below, where the non-local index prediction can be used only if it is allowed. The information regarding the non-local index prediction for a block is only signalled if the non-local index prediction is allowed.

The current CU is coded with palette mode;
The current CU is coded with 2N×2N partition mode;
The current CU is coded with a size smaller than M×M, M can be any integer such as 64, 32, 16, 8, and 4;
The current PU is coded with a size smaller than M×M, M can be any integer such as 64, 32, 16, 8, and 4;
The current TU is coded with a size smaller than M×M, M can be any integer such as 64, 32, 16, 8, and 4;
The current CU is coded with a size larger than M×M, M can be any integer such as 64, 32, 16, 8, and 4;
The current PU is coded with a size larger than M×M, M can be any integer such as 64, 32, 16, 8, and 4;
The current TU is coded with a size larger than M×M, M can be any integer such as 64, 32, 16, 8, and 4;
The current PU size is 2N×2N;
The current PU size is N×N;
The current PU size is 2N×N; and
The current PU size is N×2N.

Another aspect of the present invention discloses techniques to further improve the performance of non-local index prediction (NLIP) method. In one embodiment, the reconstructed indices associated with the coded run length can be obtained by copying from the indices in the reference block. In another embodiment, the reconstructed samples associated with the coded run length can be obtained by copying from the samples in the reference block.

Each pixel can choose the copy-left mode, the copy-above mode, or the non-local index prediction mode. Multiple flags can be coded to represent the selected modes. A decoder can infer the selected result for the current pixel implicitly.

In still another embodiment, the flags used to represent the chosen results can be CABAC coded or context coded. The flags of neighbouring pixels also can be used as contexts for the current flag.

index is MAX_INDEX-2. The variable MAX_INDEX represents the maximum number of entries in the palette.

Since some samples are unavailable in the parsing process, index redundancy removal cannot be performed for those samples. In order to solve this problem, coding all run type flags before coding all indices is disclosed according to another embodiment. And index redundancy removal is not performed for NLP samples.

An exemplary syntax structure for palette coding is shown in the following table, where the syntax lines not closely related to the present invention are excluded.

TABLE 1

|  | Note |
|---|---|
| palette_coding( x0, y0, nCbS ) { | |
| .... | |
|     if( MaxPaletteIndex > 0) { | (1-1) |
|         palette_transpose_flag | |
|     copy_inter_flag | (1-2) |
|     if( MaxPaletteIndex > 0){ | |
|         num_palette_indices_idc | |
|         for( i=0; i < NumPaletteIndices; i++ ) { | |
|             palette_index_idc | |
|             PaletteIndexIdc[ i ] = palette_index_idc | |
|         } | |
|       if(copy_inter_flag) | (1-3) |
|             last_copy_inter_run_type_flag | (1-4) |
|       if(!last_copy_inter_run_type_flag) | (1-5) |
|             last_palette_run_type_flag | (1-6) |
|     } | |
|     .... | |
|     SignalRun = copy_inter_flag | (1-7) |
|     while( PaletteScanPos < nCbS * nCbS ) { | |
|         xC = x0 + travScan[ PaletteScanPos ][ 0 ] | |
|         yC = y0 + travScan[ PaletteScanPos ][ 1 ] | |
|     .... | |
|       if(copy_inter_flag) | (1-8) |
|             copy_inter_run_type_flag[ xC ][ yC ] | (1-9) |
|       if( MaxPaletteIndex > 0 && CurrNumIndices < NumPaletteIndices ) { | |
|         if( PaletteScanPos >= nCbS && palette_run_type_flag[ xcPrev ][ ycPrev ] | (1-10) |
|             != COPY_ABOVE_MODE && PaletteScanPos < nCbS * nCbS − 1 | |
|             && ! copy_inter_run_type_flag[ xC ][ yC ]) { | |
|             palette_run_type_flag[ xC ][ yC ] | (1-11) |
|         } | |
|       .... | |
| ... | |
|     if(copy_inter_flag) | (1-12) |
|         prediction_unit( x0, y0, nCbS, nCbS ) | (1-13) |
| } | |

In one embodiment, the current pixel is not allowed to choose the non-local index prediction method if the previous pixel selects the non-local index prediction method.

For the copy modes mentioned above, one or more bits can be coded for each run to indicate whether the coded run is the last run of the current block.

Since some samples are unavailable in the parsing process, index redundancy removal cannot be performed for those samples. For example, if the current index is coded in the copy index mode and the left sample is coded in the copy inter mode, the sample value or index of the left pixel cannot be obtained until the motion compensation step. Therefore, redundancy removal cannot be performed at the parsing stage. In order to solve this problem, coding one or more additional refinement bits is performed and index redundancy removal can be always performed for all samples.

In one embodiment, if the parsed out index is equal to MAX_INDEX-1, one additional refinement bit should be parsed. If the refinement bit is equal to 1, the reconstructed index is MAX_INDEX-1. Otherwise, the reconstructed In Table 1, the open curly bracket with line-filled background after "if(MaxPaletteIndex>0)" is deleted as indicated by Note (1-1). A new syntax element copy_inter_flag according to an embodiment of the present invention is included as indicated by Note (1-2). Syntax element copy_inter_flag equal to 1 specifies that the current coding unit is coded by inter palette mode. copy_inter_flag equal to 0 specifies that the current coding unit is not coded by inter palette mode. When copy_inter_flag is not present, it is inferred to be equal to 0. When copy_inter_flag has a value of 1 as indicated by Note (1-3), syntax element last_copy_inter_run_type_flag is included as indicated by Note (1-4). Syntax element last_copy_inter_run_type_flag equal to 1 specifies that the last one run type is COPY_INTER mode. If last_copy_inter_run_type_flag is 0 as indicated by Note (1-5), syntax element last_palette_run_type_flag is included as indicated by Note (1-6) to specify whether the last run mode is the copy above mode or copy index mode.

When copy_inter_flag is equal to 1 as indicated by Note (1-8), syntax element copy_inter_run_type_flag[xC][yC] is included as indicated by Note (1-9) to indicate whether the current palette index is equal to the palette index at the same location inside the index map of the block indicated by the decoded block vector. Since the non-local prediction is indicated separately as indicated by Note (1-9), syntax element palette_run_type_flag[xC][yC] in Note (1-11) is not signaled when copy_inter_run_type_flag[xC][yC] is equal to 1 as indicated by Note (1-10).

In Table 1, when syntax element copy_inter_flag is equal to 1 as indicated by Note (1-12), syntax structure for PU (i.e., prediction_unit( )) is included as indicated by Note (1-13).

In another embodiment, the run type for the current pixel is not allowed to use COPY_INTER mode if the run type for the previous pixel is COPY_INTER mode. Exemplary syntax structure related to this embodiment is shown in the following syntax table. As shown in table 2, syntax copy_inter_run_type_flag is include only when syntax element copy_inter_flag has a value of 1 and the previous pixel is not coded in COPY_INTER mode (i.e., palette_run_type_flag [xcPrev][ycPrev]!=COPY_INTER)

TABLE 2 if(copy_inter_flag&& palette_run_type_flag[ xcPrev ][ ycPrev ]
!= COPY_INTER )
    copy_inter_run_type_flag[ xC ][ yC ]

In Table 1, various changes in the syntax structure for palette coding have been illustrated to incorporate various embodiments of the present invention. However, the changes in the syntax structure are intended to serve as examples according to embodiments of the present invention. They shall not be construed as limitations of the present invention. Also, these changes do not necessarily have to be all included to implement the present invention.

Figure 16:
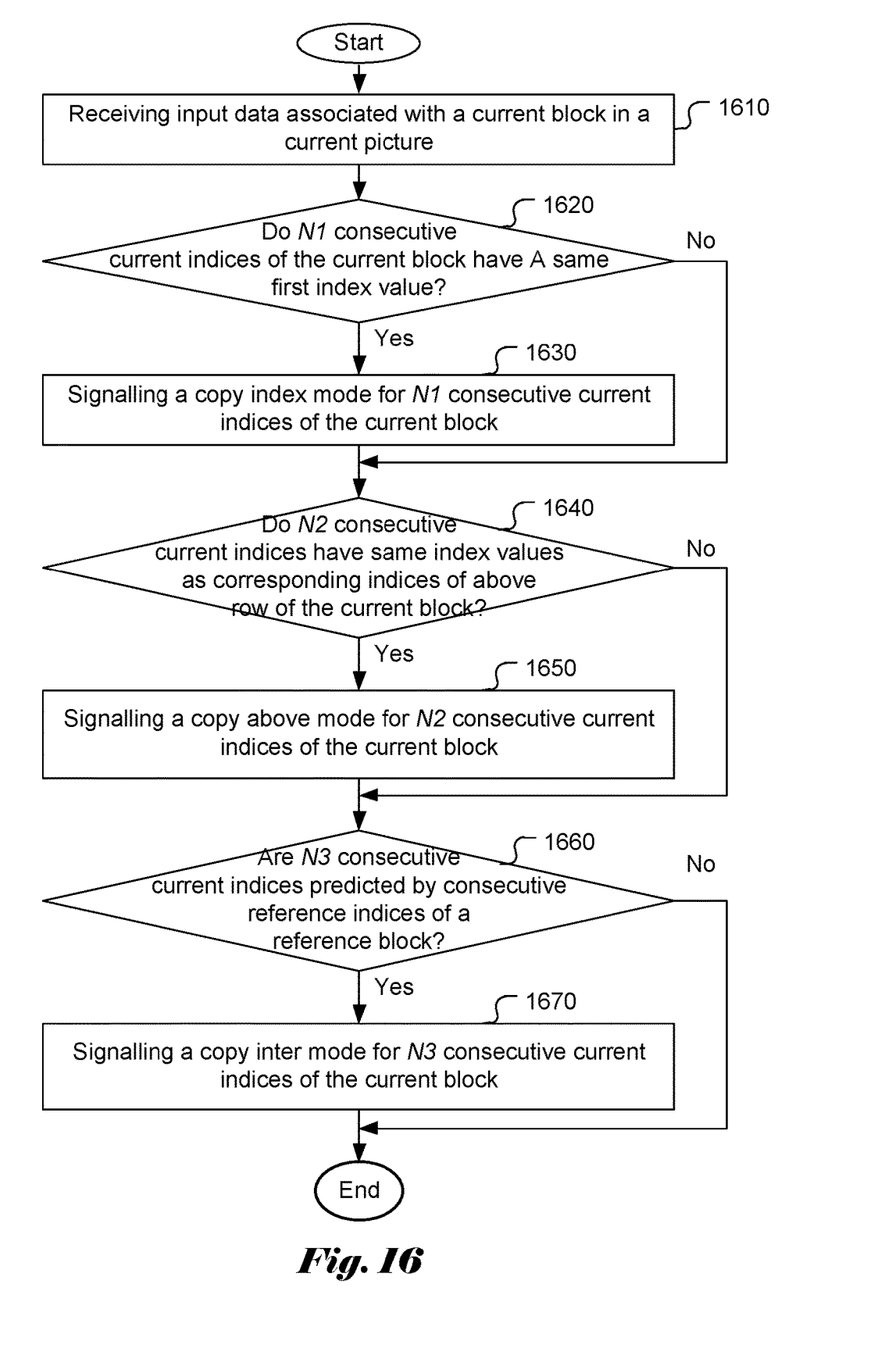
FIG. 16 illustrates an exemplary flowchart for a video encoder using palette coding modes including the copy inter mode according to an embodiment of the present invention.

FIG. 16 illustrates an exemplary flowchart for a video encoder using palette coding modes including the copy inter mode according to an embodiment of the present invention. The encoder receives input data associated with a current block in a current picture in step 1610. Whether N1 consecutive current indices of the current block have same index value is checked in step 1620. If the result is "Yes", step 1630 is performed. Otherwise (i.e., the "No" path), step 1630 is skipped. In step 1630, the system signals a copy index mode for N1 consecutive current indices of the current block. Whether N2 consecutive current indices have same index values as corresponding indices of above row of the current block is checked in step 1640. If the result is "Yes", step 1650 is performed. Otherwise (i.e., the "No" path), step 1650 is skipped. In step 1650, the system signals a copy above mode for N2 consecutive current indices of the current block. Whether N3 consecutive current indices are predicted by consecutive reference indices of a reference block is checked in step 1660. If the result is "Yes", step 1670 is performed. Otherwise (i.e., the "No" path), step 1670 is skipped. In step 1670, the system signals a copy inter mode for N3 consecutive current indices of the current block.

Figure 17:
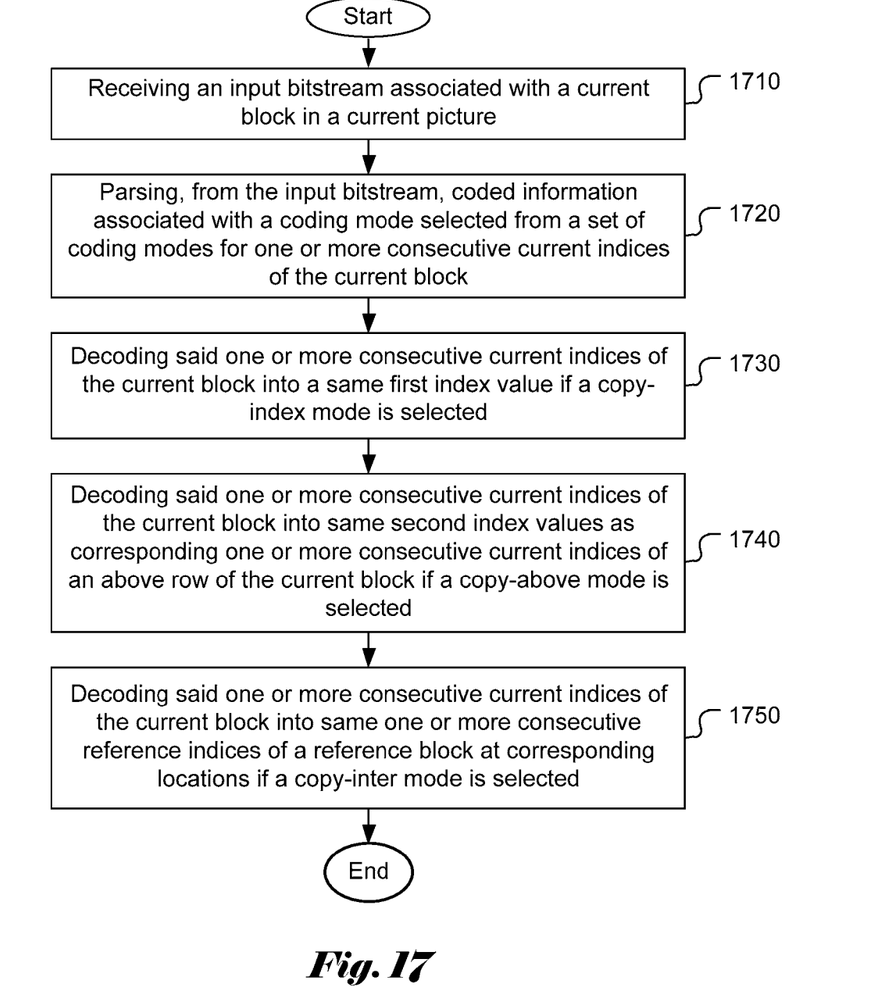
FIG. 17 illustrates an exemplary flowchart for a video decoder using palette coding modes including the copy inter mode according to an embodiment of the present invention.

FIG. 17 illustrates an exemplary flowchart for a video decoder using palette coding modes including the copy inter mode according to an embodiment of the present invention. The system receives an input bitstream associated with a current block in a current picture in step 1710. Coded information associated with a coding mode selected from a set of coding modes for one or more consecutive current indices of the current block is parsed from the input bitstream in step 1720. One or more consecutive current indices of the current block are decoded into a same first index value if a copy-index mode is selected in step 1730. One or more consecutive current indices of the current block are decoded into same second index values as corresponding one or more consecutive current indices of an above row of the current block if a copy-above mode is selected in step 1740. One or more consecutive current indices of the current block are decoded into same one or more consecutive reference indices of a reference block at corresponding locations if a copy-inter mode is selected in step 1750.

The flowcharts shown above are intended to illustrate examples for systems incorporating embodiments of the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video decoding for a block in a picture or a depth image, comprising:
   receiving an input bitstream associated with a current block in a current picture or a current depth image;
   parsing, from the input bitstream, coded information associated with a coding mode selected from a set of coding modes for one or more consecutive current samples or indices of the current block;
   decoding said one or more consecutive current samples or indices of the current block into a same first sample value or first index value if a copy-index mode is selected;
   decoding said one or more consecutive current samples or indices of the current block into same second sample values or second index values as corresponding one or more consecutive current samples or indices of an above row of the current block if a copy-above mode is selected; and
   decoding said one or more consecutive current samples or indices of the current block into same one or more consecutive reference samples or indices of a reference block at corresponding locations if a copy-inter mode is selected, wherein the reference block selected for the copy-inter mode comprises reference samples, and the reference samples are converted to reference indices before the reference block is used to predict current indices of the current block.

2. The method of claim 1, further comprising parsing motion vector information from the input bitstream, wherein the motion vector information is used to locate the reference block.

3. The method of claim 2, wherein the motion vector information is related to a motion vector (MV) for the reference block corresponding to an Inter-prediction 2N×2N coding unit (CU).

4. The method of claim 2, wherein the motion vector information is related to a block vector (BV) and the motion vector information is signalled in the input bitstream in a same manner as BV signalling in intra Block Copy (IntraBC) mode.

5. The method of claim 1, wherein location of the reference block is determined implicitly without position information of the reference block signalled in the input bitstream.

6. The method of claim 1, wherein the reference block is in the current picture or the current depth image.

7. The method of claim 1, wherein the reference block is in a different picture from the current picture or a different depth image from the current depth image.

8. The method of claim 1, wherein the reference block is from a reconstructed picture/a reconstructed depth image or a prediction picture/a prediction depth image of the current block.

9. The method of claim 1, further comprising parsing, from the input bitstream, a control flag specifying whether to enable the copy-inter mode, and the set of coding modes includes the copy-inter mode if the control flag indicates that the copy-inter mode is enabled.

10. The method of claim 1, wherein whether to enable the copy-inter mode is determined implicitly at a decoder, and the set of coding modes includes the copy-inter mode if the copy-inter mode is enabled.

11. The method of claim 1, wherein each reference sample of the reference block is converted to one reference index by selecting a nearest index from a reference palette.

12. The method of claim 1, wherein the reference block is flipped horizontally, vertically, or both horizontally and vertically before the reference samples are converted to the reference indices.

13. The method of claim 1, wherein the reference block is rotated clockwise or counter-clockwise, is transposed, or is transformed using an arbitrary function before the reference samples are converted to the reference indices.

14. The method of claim 1, wherein the reference block is selected from multiple reference block candidates and selection of the reference block is signalled explicitly by an encoder or implicitly derived by a decoder.

15. The method of claim 1, wherein a current palette for the current block is predicted by or copied from a reference palette of the reference block.

16. A method of video encoding for a block in a picture or a depth image, comprising:
   receiving input data associated with a current block in a current picture or a current depth image;
   determining a coding mode from a set of coding modes including a copy-index mode, a copy-above mode and a copy-inter mode for one or more consecutive current samples or indices of the current block, wherein:
      the copy-index mode is selected if said one or more consecutive current samples or indices of the current block all have a same first sample value or first index value;
      the copy-above mode is selected if said one or more consecutive current samples or indices of the current block all have same second sample values or second index values as corresponding one or more consecutive current samples or indices of an above row of the current block;
      the copy-inter mode is selected if said one or more consecutive current samples or indices of the current block are predicted by one or more consecutive reference samples or indices of a reference block at corresponding locations; and
      the reference block selected for the copy-inter mode comprises reference samples and the reference samples are converted to reference indices before the reference block is used to predict current indices of the current block; and
   signalling coded information associated with the coding mode selected for said one or more consecutive current samples or indices of the current block.

17. The method of claim 16, further comprising signalling motion vector information in a bitstream for the current block, wherein the motion vector information is used to locate the reference block.

18. The method of claim 17, wherein the motion vector information is related to a motion vector (MV) for the reference block corresponding to art Inter-prediction 2N×2N coding unit (CU), or the motion vector information is related to a block vector (BV) and the motion vector information is signalled in the bitstream in a same manner as BV tailing in Intra Block Copy (IntraBC) mode.

19. The method of claim 16, wherein location of the reference block is determined implicitly without position information of the reference block signalled in a bitstream for the current block.

20. The method of claim 16, wherein the reference block is in the current picture, the current depth image, a different picture from the current picture, or a different depth image from the current depth image.

21. The method of claim 16, wherein the reference block is from a reconstructed picture/a reconstructed depth image or a prediction picture/a prediction depth image of the current block.

22. The method of claim 16, further comprising signalling, in a bitstream for the current block, a control flag specifying whether to enable the copy-inter mode, and the set of coding modes includes the copy-inter mode if the control flag indicates that the copy-inter mode is enabled.

23. The method of claim 16, wherein decision regarding whether to enable the copy-inter mode depends on size, shape, partition type, coding mode, MV information or BV information of the current block, and the current block corresponds to a current coding unit (CU), a current prediction unit (PU) or a current transform unit (TU).

24. The method of claim 16, wherein each reference sample of the reference block is converted to one reference index by selecting a nearest index from a reference palette.

25. The method of claim 16, wherein a process is applied to the reference block before the reference samples are converted to the reference indices, the process comprises one or a combination of a block horizontal flipping process, a block vertical flipping process, a block clockwise rotating process, a block counter-clockwise rotating process, a block transposing process, and a block arbitrary transforming process.

26. The method of claim 16, wherein the reference block is selected from multiple reference block candidates and selection of the reference block is signalled explicitly by an encoder or implicitly derived by a decoder.

27. The method of claim 16, wherein a current palette for the current is predicted by or copied from a reference palette of the reference block.

28. An apparatus for video decoding of a block in a picture or a depth image, comprising one or more electronic circuits configured to:
  receive an input bitstream associated with a current block in a current picture or a current depth image;
  parse, from the input bitstream, coded information associated with a coding mode selected from a set of coding modes for one or more consecutive current samples or indices of the current block;
  decode said one or more consecutive current samples or indices of the current block into a same first sample value or first index value if a copy-index mode is selected;
  decode said one or more consecutive current samples or indices of the current block into same second sample values or second index values as corresponding one or more consecutive current samples or indices of an above row of the current block if a copy-above mode is selected; and
  decode said one or more consecutive current samples or indices of the current block into same one or more consecutive reference samples or indices of a reference block at corresponding locations if a copy-inter mode is selected, wherein the reference block selected for the copy-inter mode comprises reference samples, and the reference samples are converted to reference indices before the reference block is used to predict current indices of the current block.

* * * * *